US011980896B2

(12) United States Patent
Lambert et al.

(10) Patent No.: US 11,980,896 B2
(45) Date of Patent: May 14, 2024

(54) AGGREGATE PROCESSING SYSTEMS, METHODS AND APPARATUS

(71) Applicant: Superior Industries, Inc., Morris, MN (US)

(72) Inventors: Doug Lambert, Morris, MN (US); Mark Crooks, Morris, MN (US); Lafe Grimm, Morris, MN (US); Matthew Gordon, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 17/654,116

(22) Filed: Mar. 9, 2022

(65) Prior Publication Data

US 2022/0288603 A1 Sep. 15, 2022

Related U.S. Application Data

(60) Provisional application No. 63/158,592, filed on Mar. 9, 2021.

(51) Int. Cl.
*B03B 7/00* (2006.01)
*B03B 5/04* (2006.01)
*B03B 11/00* (2006.01)

(52) U.S. Cl.
CPC .................. *B03B 7/00* (2013.01); *B03B 5/04* (2013.01); *B03B 11/00* (2013.01)

(58) Field of Classification Search
CPC .. B03B 7/00; B03B 5/04; B03B 11/00; B03B 9/00; B07B 13/16; B07B 1/46; B07B 1/005
USPC .......................................................... 209/315
See application file for complete search history.

(56) References Cited

U.S. PATENT DOCUMENTS

2008/0128333 A1 6/2008 Smith et al.
2019/0126173 A1* 5/2019 Loshe ................ B01D 21/0042

FOREIGN PATENT DOCUMENTS

CN 216094791 3/2022
WO 2020047131 3/2020
WO WO-2020047131 A1 * 3/2020 ............... B07B 1/46

OTHER PUBLICATIONS

Great Britain Office Action in Great Britain Application No. GB2203304.7, dated Aug. 15, 2022, 2 pages.

* cited by examiner

*Primary Examiner* — Gene O Crawford
*Assistant Examiner* — Muhammad Awais
(74) *Attorney, Agent, or Firm* — Todd R. Fronek; Larkin Hoffman Daly & Lindgren, Ltd.

(57) ABSTRACT

Aggregate processing systems, methods, and apparatus are described. In some embodiments, a plant is configurable in one of a plurality of configurations.

24 Claims, 23 Drawing Sheets

AGGREGATE PROCESSING SYSTEMS, METHODS AND APPARATUS

BACKGROUND

Aggregate processing plants such as washing and/or classifying plants and related equipment are used to remove fine material and/or contaminants from and/or to classify aggregate materials.

DESCRIPTION

Figure 1:
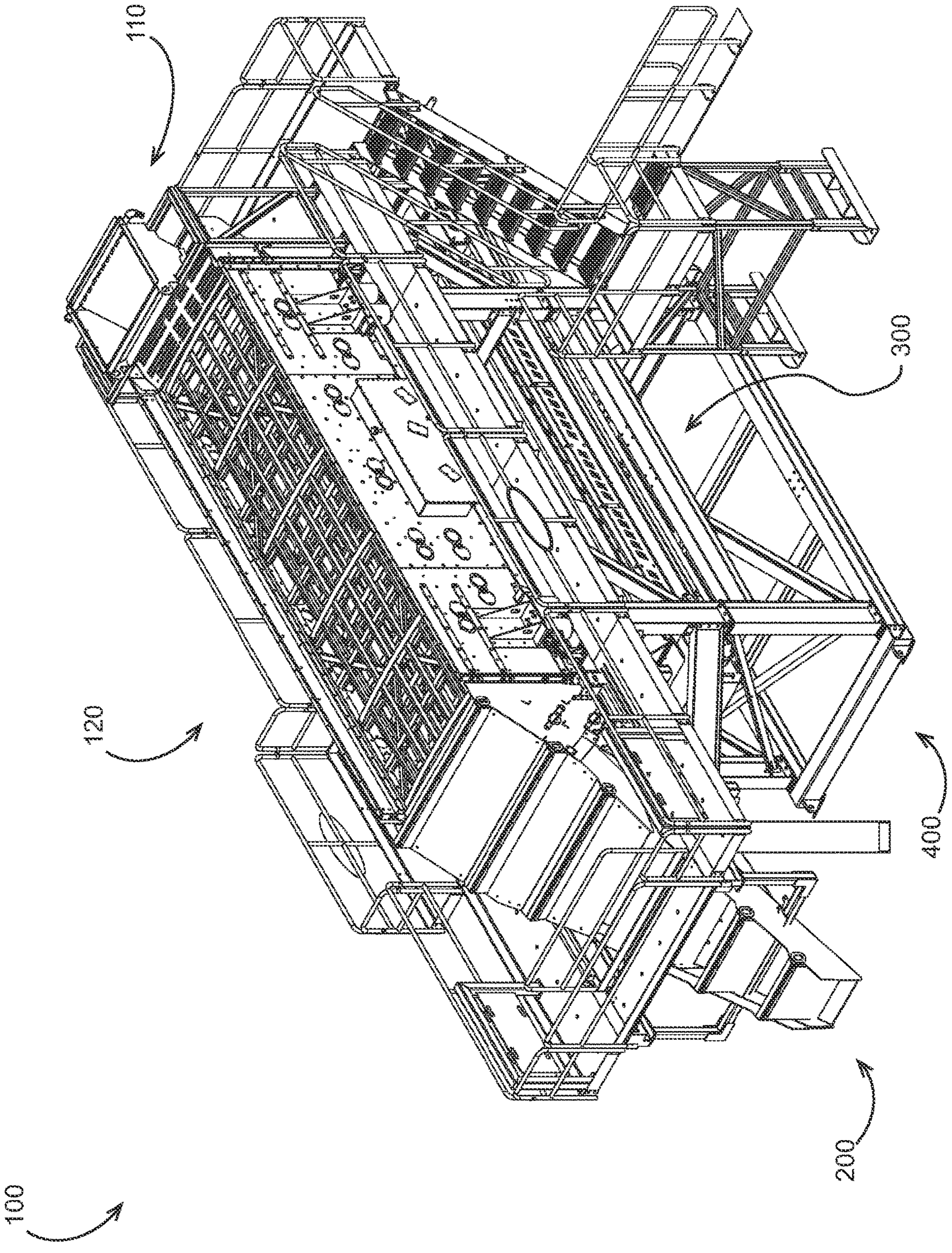
FIG. 1 is a perspective view of an embodiment of an aggregate processing plant in a dry processing configuration.
Figure 2:
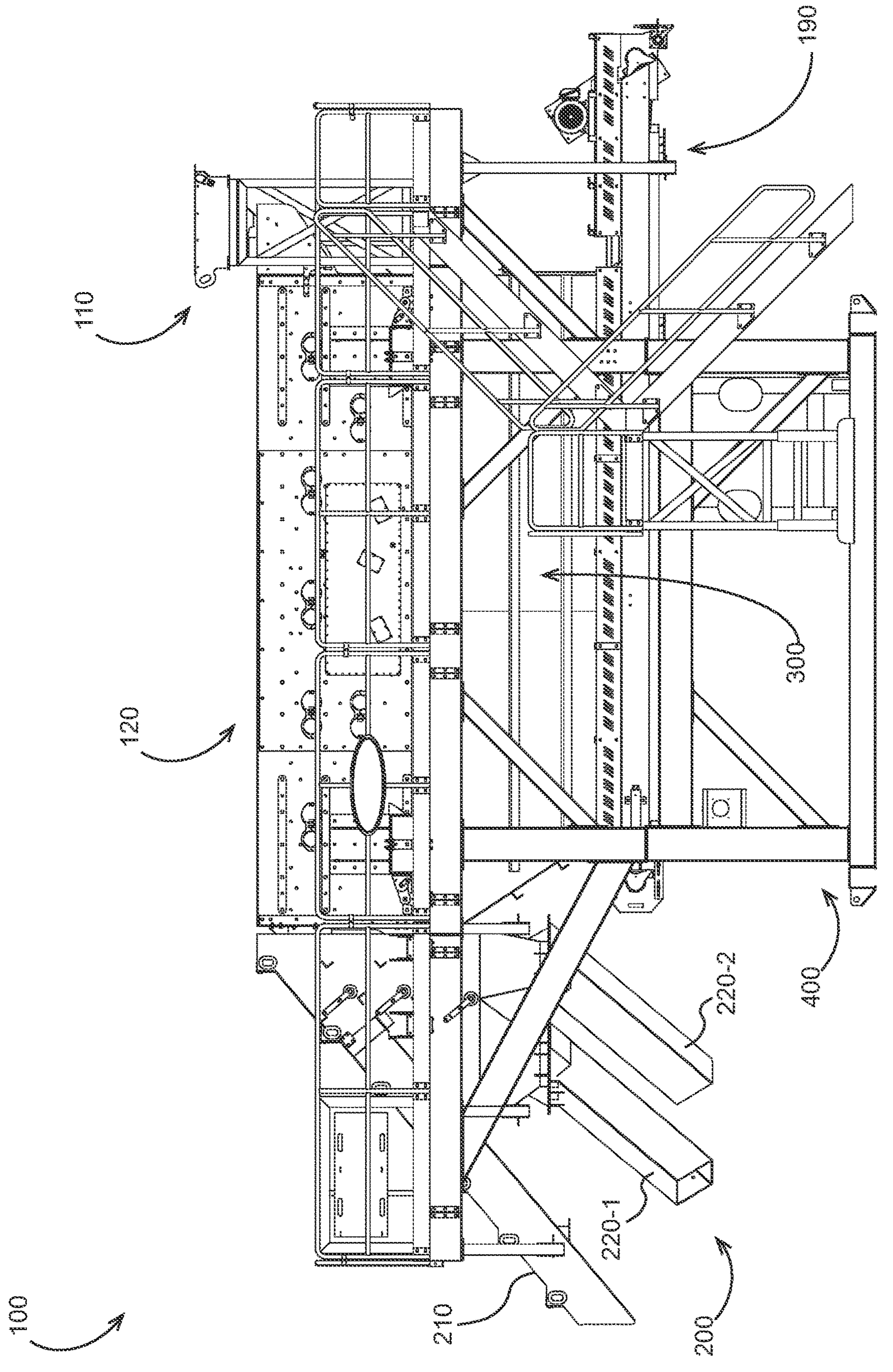
FIG. 2 is a side elevation view of the aggregate processing plant of FIG. 1.
Figure 3:
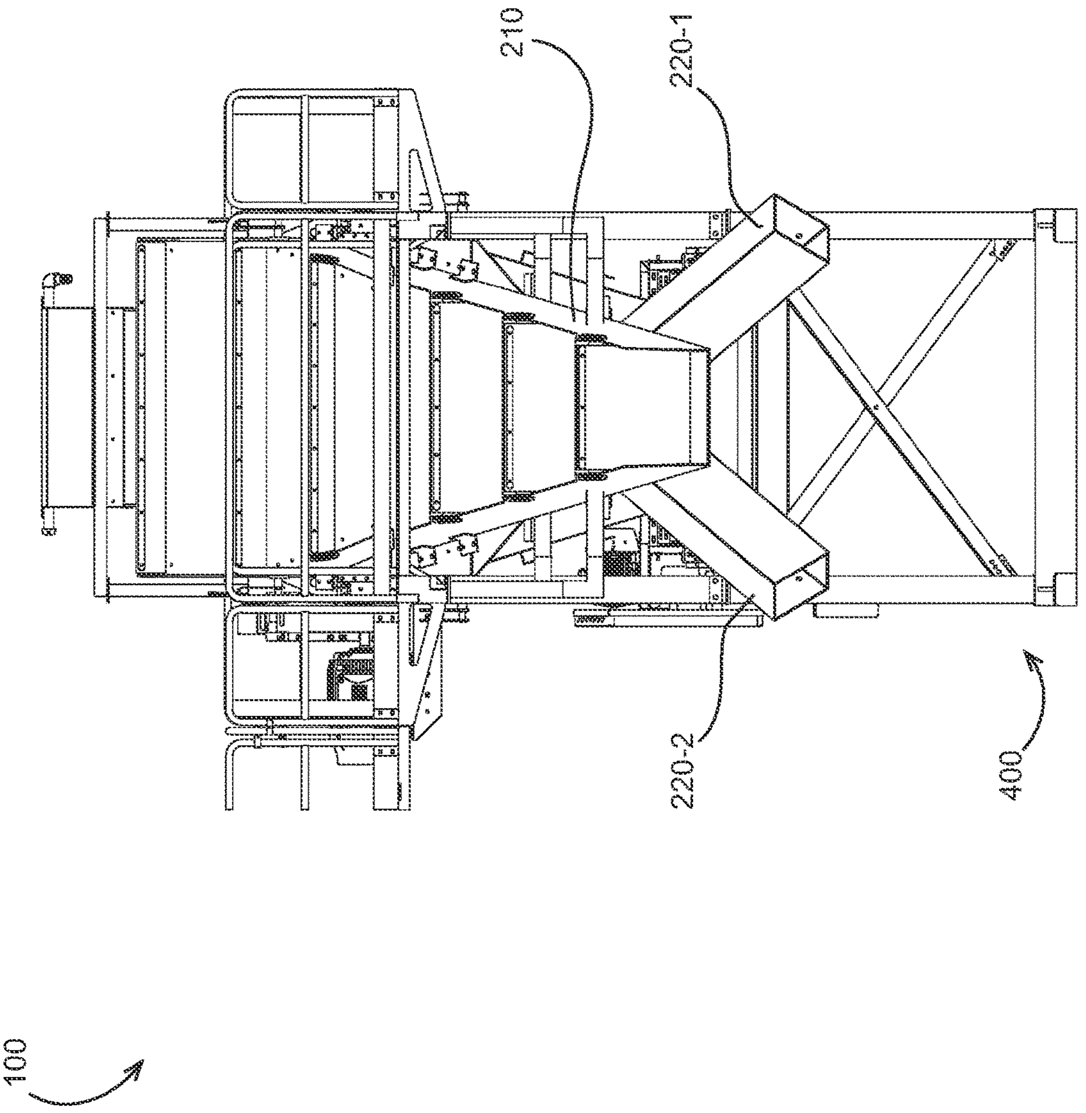
FIG. 3 is a front elevation view of the aggregate processing plant of FIG. 1.

Referring to the drawings, wherein like reference numerals designate identical or corresponding parts throughout the several views, FIGS. 1-3 illustrate an embodiment of an aggregate processing plant 100 including a vibratory screen 120 (e.g., 3-deck screen, 4-deck screen, etc.) supported on a frame 400. A feeder or hopper 110 is optionally provided on the screen 120 for receiving aggregate material and depositing aggregate material onto one or more decks of the screen 120. In some embodiments, a dry hopper 300 is disposed below the screen 120 and is optionally removable from the frame 400, e.g., by one or more methods described herein.

In some embodiments, a chute assembly 200 is disposed in front of the screen 120 and is supported on the frame 400. The chute assembly 200 optionally includes a plurality of chutes (e.g., an upper chute 210 and lower chutes 220-1, 220-2) disposed to receive material from the screen 120. In some embodiments the screen 120 is a three-deck vibratory screen. In some embodiments, each deck of the screen 120 is aligned with one of the chutes of the chute assembly 200 such that oversize material passing over the top of each deck is transferred to an associated chute.

In some embodiments, a conveyor 190 or other device is disposed below the dry hopper 300 and configured to convey material from the dry hopper to another location.

Figure 4:
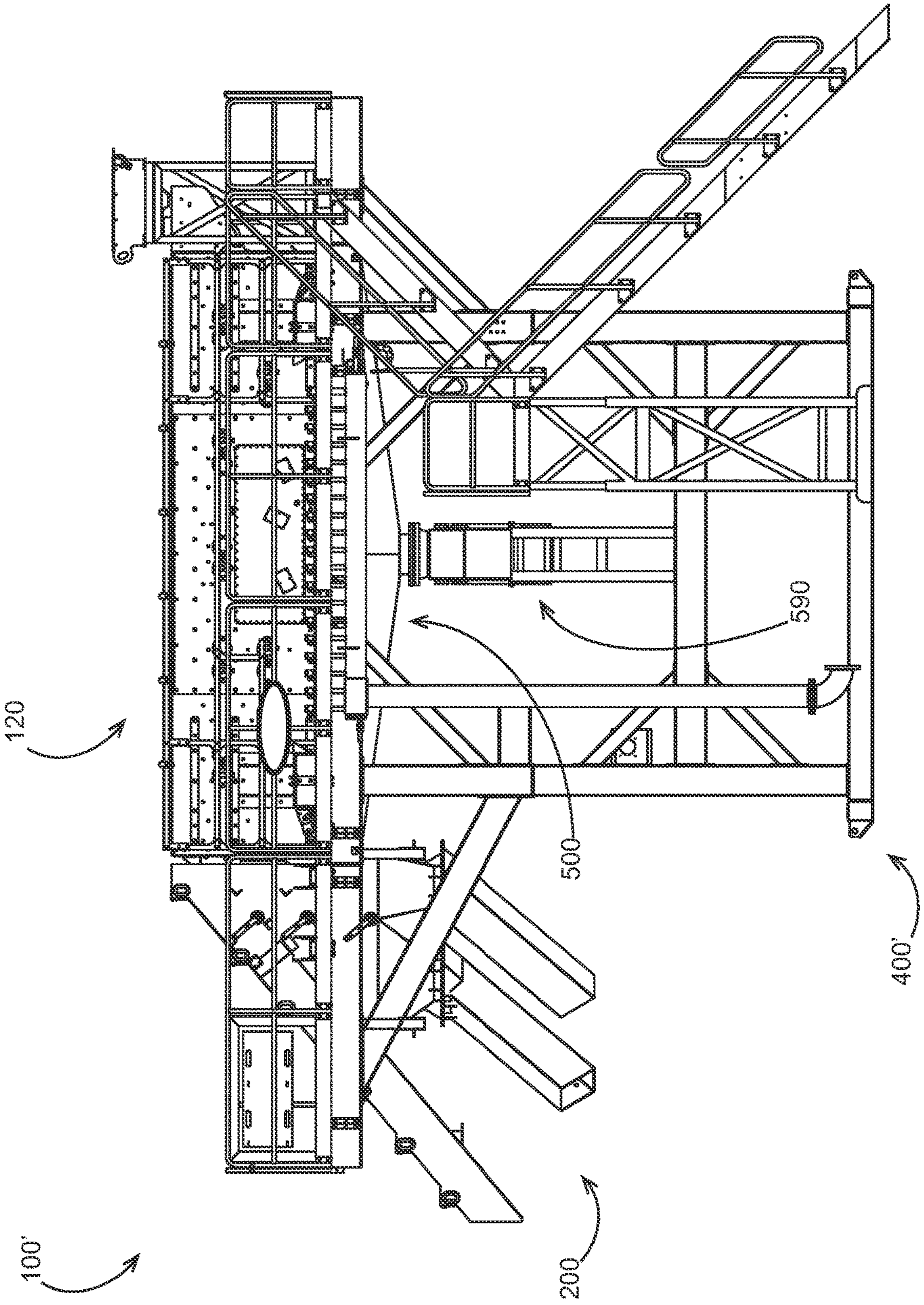
FIG. 4 is a side elevation view of an embodiment of an aggregate processing plant in a wet processing configuration.

Referring to FIG. 4, the aggregate processing plant 100 is optionally reconfigurable into an aggregate processing plant configuration 100' including the screen 120 supported on a modified frame 400', which optionally has a modified height relative to the frame 400. In some embodiments, a wet flume 500 is disposed below the screen 120 and is optionally removable from the frame 400'. In some embodiments a chute assembly 590 is disposed below the wet flume 500 to receive material from the wet flume 500.

Referring to FIGS. 5-13, methods and apparatus are illustrated for reconfiguring an aggregate processing plant 600 between a wet configuration and a dry configuration. The plant 600 optionally has one or more features or functionality in common with the plant 100.

Figure 5:
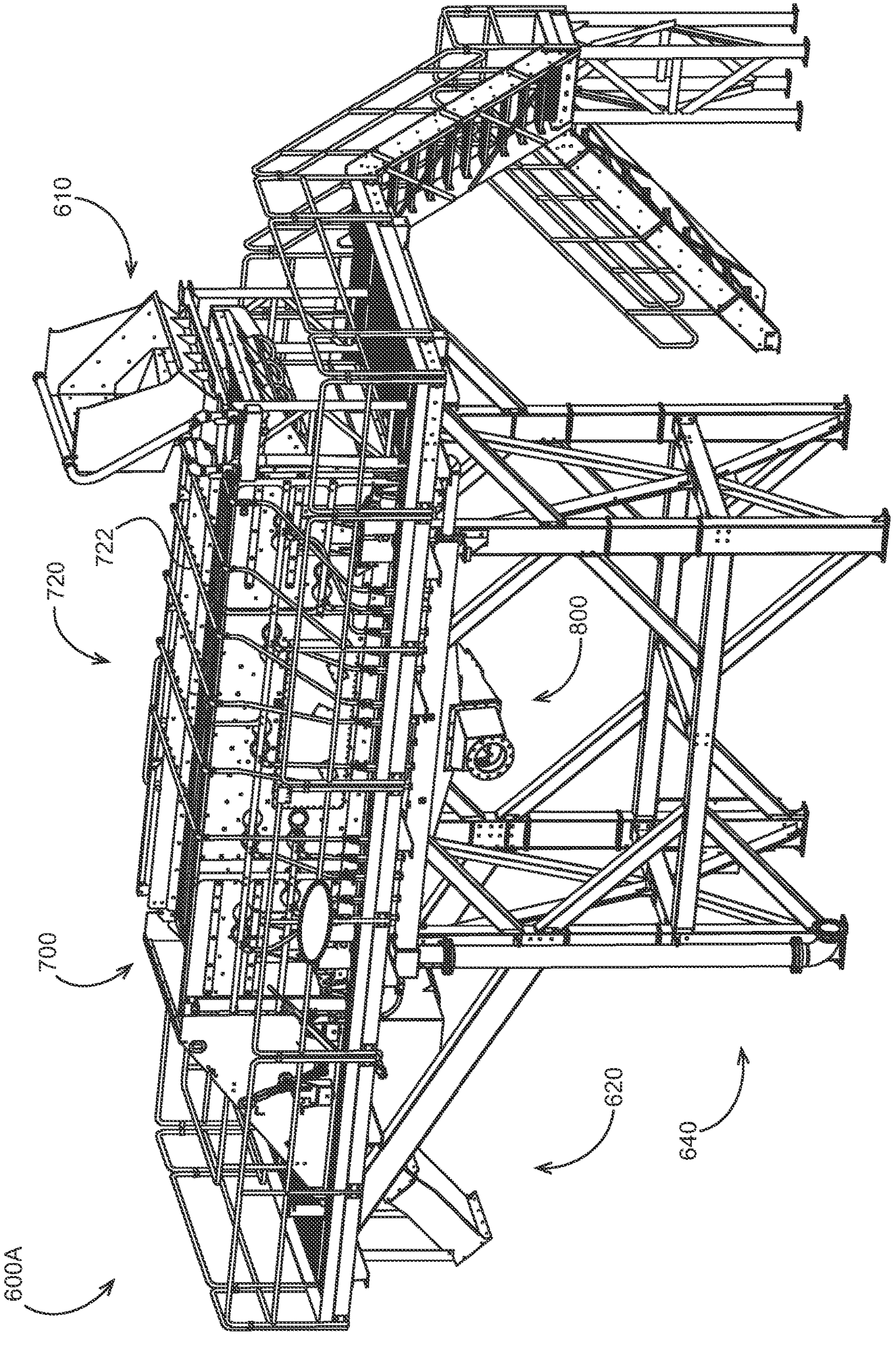
FIG. 5 is a perspective view of another embodiment of an aggregate processing plant in a wet processing configuration.

Referring to FIG. 5, the plant 600 is shown in a wet configuration 600A. The plant 600 is optionally supported on a frame 640. The plant 600 optionally includes a vibratory screen 700 optionally including a water system 720 with one or more water injection elements 722 such as spray bars. A wet hopper 610 (e.g., having one or more water injection elements such as spray bars) is optionally provided at an inlet of the screen 700. The plant 600 optionally includes a chute assembly 620 for directing oversize material passing over one or more decks of the screen 700 (e.g., three decks, four decks, etc.). A wet flume 800 is optionally removably supported on frame 640 and disposed to receive undersize material passing through each of the decks of the screen 700.

Figure 6:
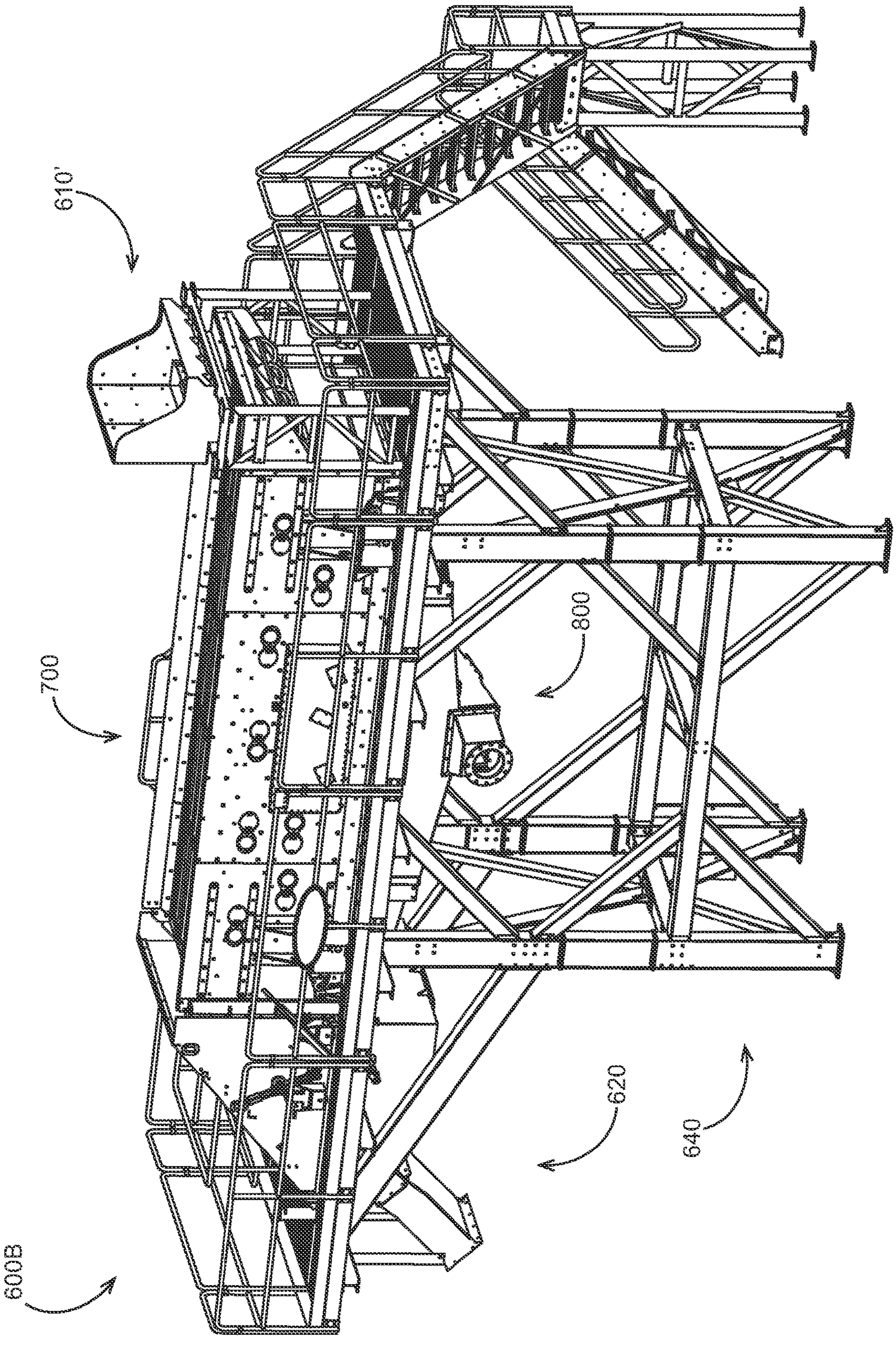
FIG. 6 is a perspective view of the aggregate processing plant of FIG. 5 in a partially reconfigured configuration.

Referring to FIG. 6, the plant 600 is shown in a partially reconfigured configuration 600B. In configuration 600B, water system 720 is optionally at least partially or entirely removed (e.g., one or more spray elements 722 and/or associated manifolds and conduits are optionally removed). In configuration 600B, the wet hopper 610 is optionally removed and a dry hopper 610' (e.g., not having a water injection element) is optionally installed.

Figure 7:
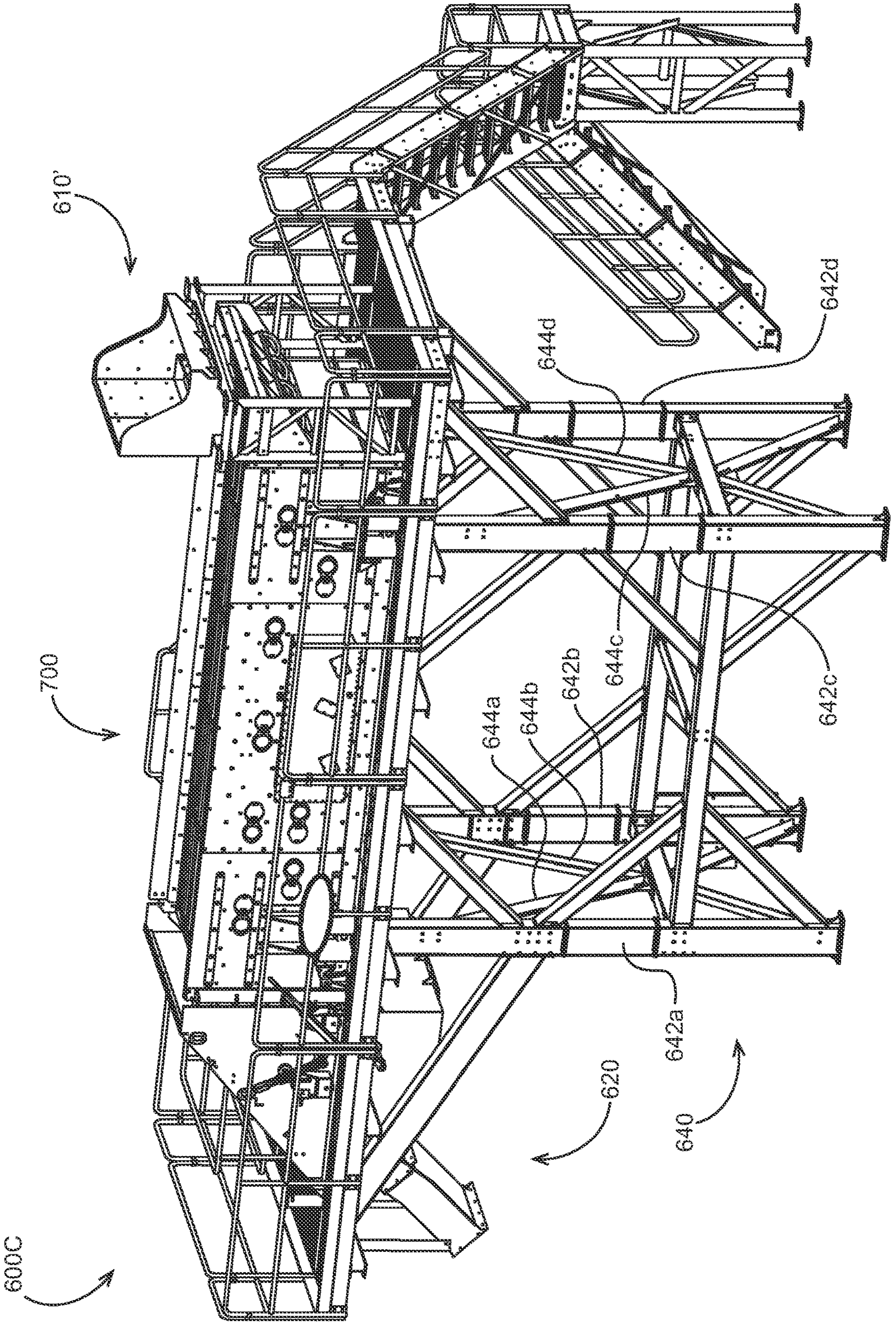
FIG. 7 is a perspective view of the aggregate processing plant of FIG. 5 in a partially reconfigured configuration.
Figure 8:
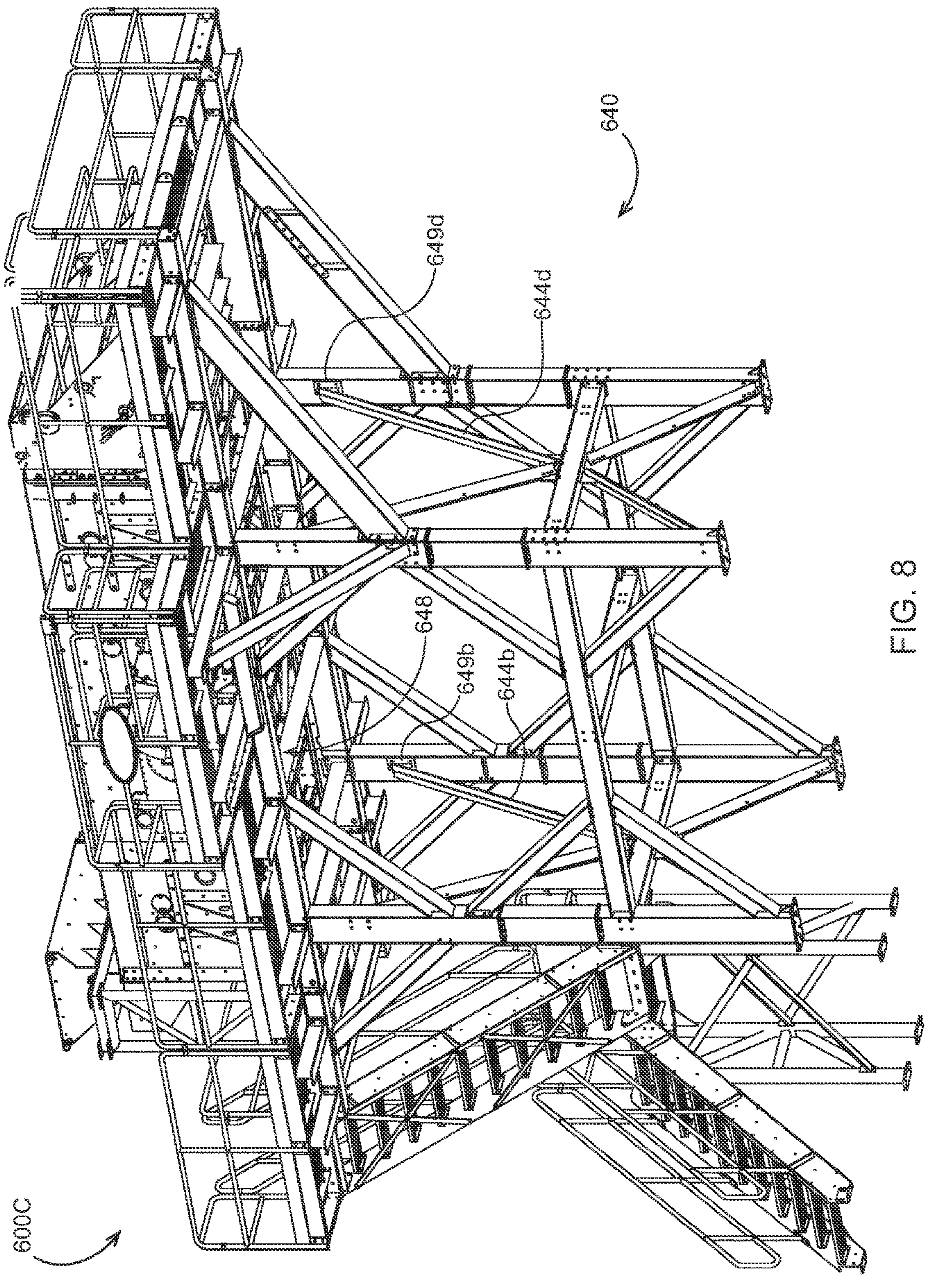
FIG. 8 is another perspective view of the aggregate processing plant of FIG. 5 in the configuration of FIG. 7.

Referring to FIGS. 7 and 8, the plant 600 is shown in a partially reconfigured configuration 600C. In configuration 600C, the wet flume 800 is optionally removed (e.g., as a single unit or in pieces) from the frame 640. In some embodiments, wet flume 800 is removed by removing fasteners (e.g., bolts) optionally connecting one or more mounting portions (e.g., lips, flanges, etc.) of the wet flume 800 from an array of mounting openings 648 (e.g., bolt holes).

Figure 9:
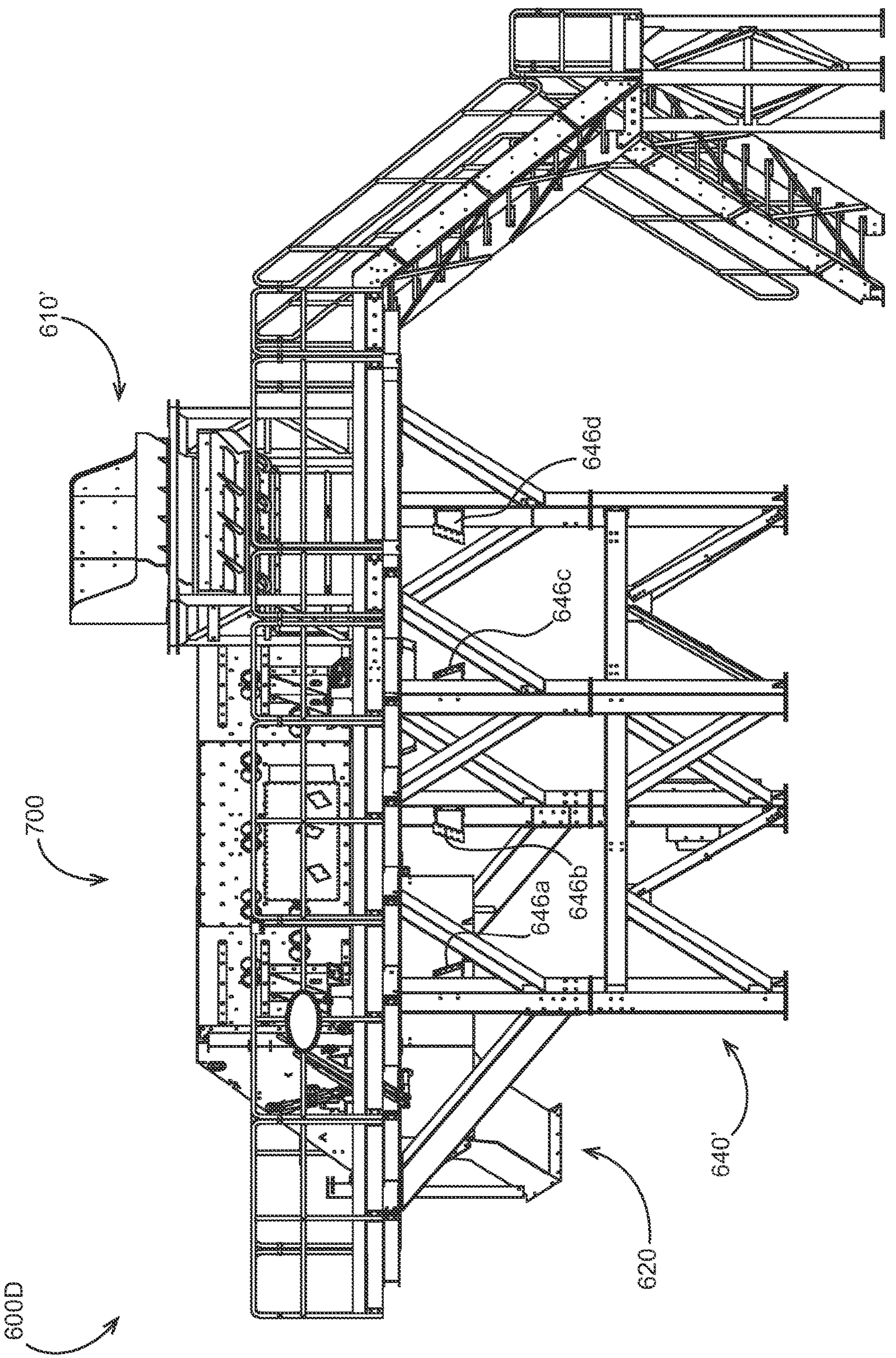
FIG. 9 is a perspective view of the aggregate processing plant of FIG. 5 in a partially reconfigured configuration.

Referring to FIG. 9, the plant 600 is shown in a partially reconfigured configuration 600D. In configuration 600D, the frame 640 is modified to a modified frame 640'. The modified frame 640' is optionally shortened, e.g., by removing a plurality of extensions 642 (e.g., beams or other structural supports). The modified frame 640' is optionally additionally modified by removing one or more angled structural supports 644 (see FIG. 8). The modified frame 640' optionally includes a plurality of dry hopper supports 646. Supports 646 optionally include angled mounting plates for attaching a wall of a dry hopper as described below. Supports 646 are optionally mounted to vertical supports of frame 640', optionally at locations 649 (see FIG. 8) at which the angled structural supports were mounted in the frame 640.

Figure 10:
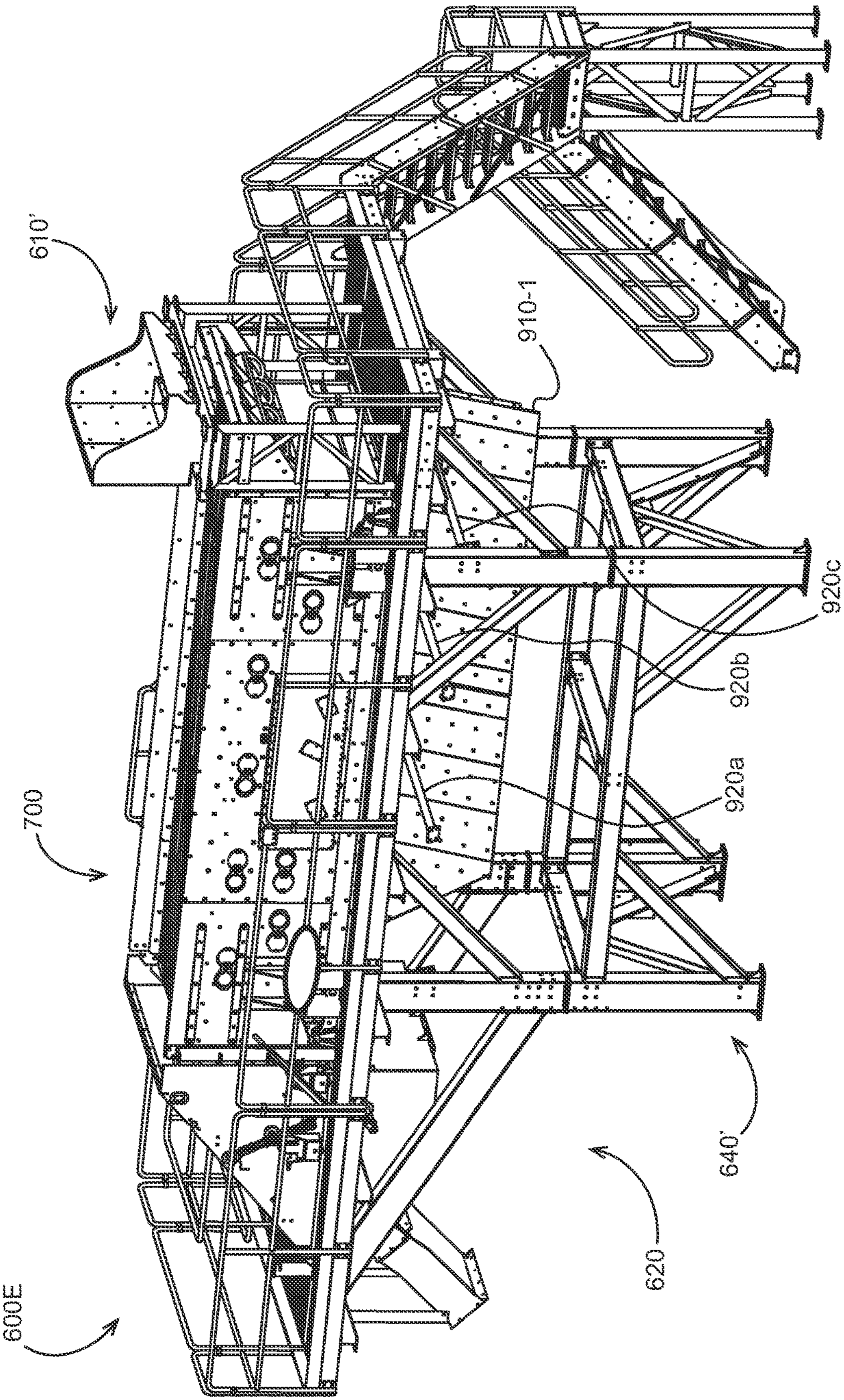
FIG. 10 is a perspective view of the aggregate processing plant of FIG. 5 in a partially reconfigured configuration.

Referring to FIG. 10, the plant 600 is shown in a partially reconfigured configuration 600E. In configuration 600E, a first dry hopper wall 910-1 is optionally supported on mounting openings 648 of frame 640' or another set of openings provided in frame 640'. First dry hopper wall 910-1 is optionally supported on associated supports 646 of frame 640'. One or more cross-supports 920 (e.g., structural members such as beams or struts) are optionally mounted to first dry hopper wall 910-1.

Figure 11:
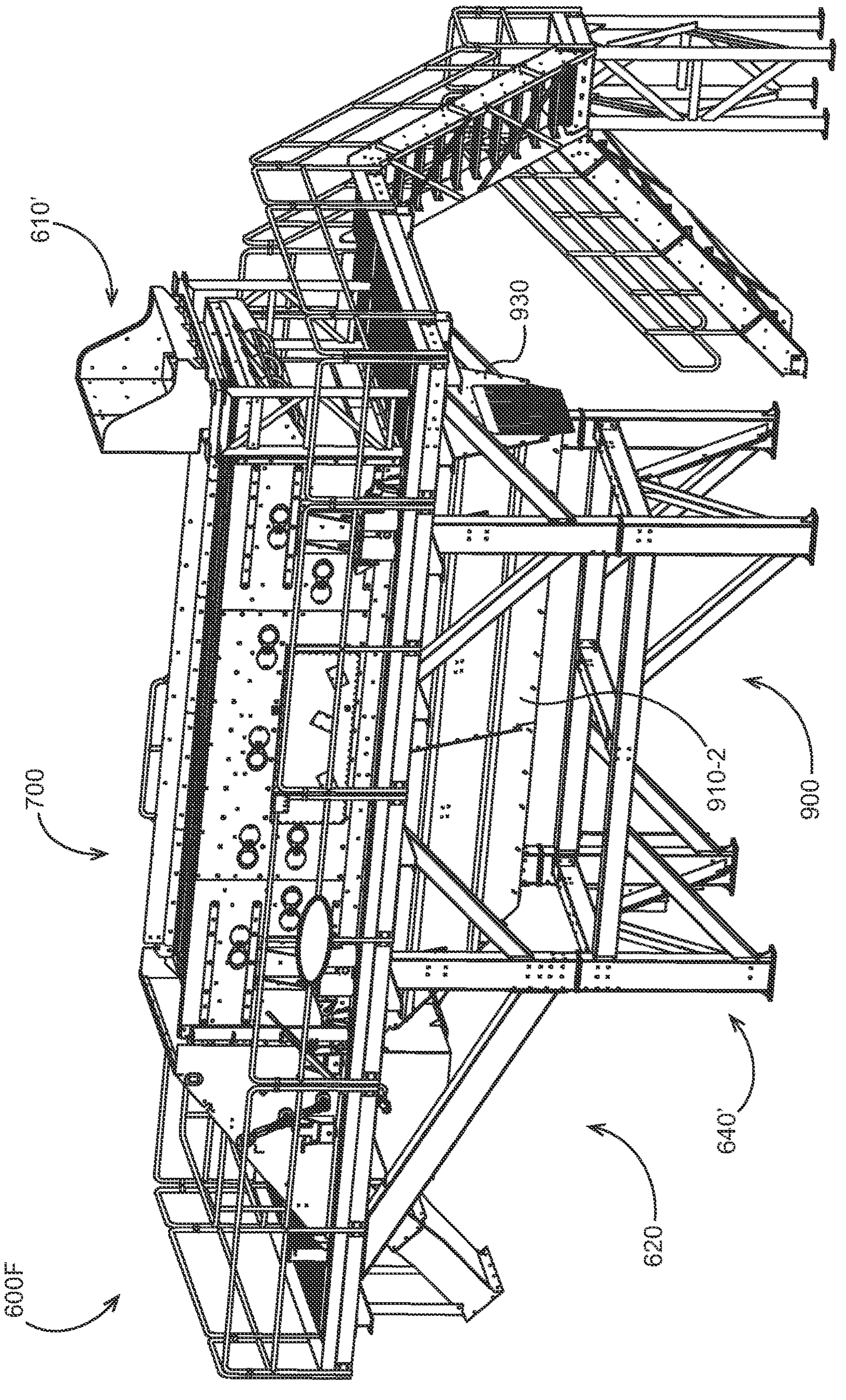
FIG. 11 is a perspective view of the aggregate processing plant of FIG. 5 in a partially reconfigured configuration.

Referring to FIG. 11, the plant 600 is shown in a partially reconfigured configuration 600F. In configuration 600F, a second dry hopper wall 910-2 is optionally supported on mounting openings 648 of frame 640' or another set of openings provided in frame 640'. Second dry hopper wall 910-2 is optionally supported on associated supports 646 of frame 640'. Each of the cross-supports 920 are optionally mounted to second dry hopper wall 910-2. End walls 930 are optionally mounted to each end of the dry hopper walls 910-1, 920-2 to form a dry hopper 900.

Figure 12:
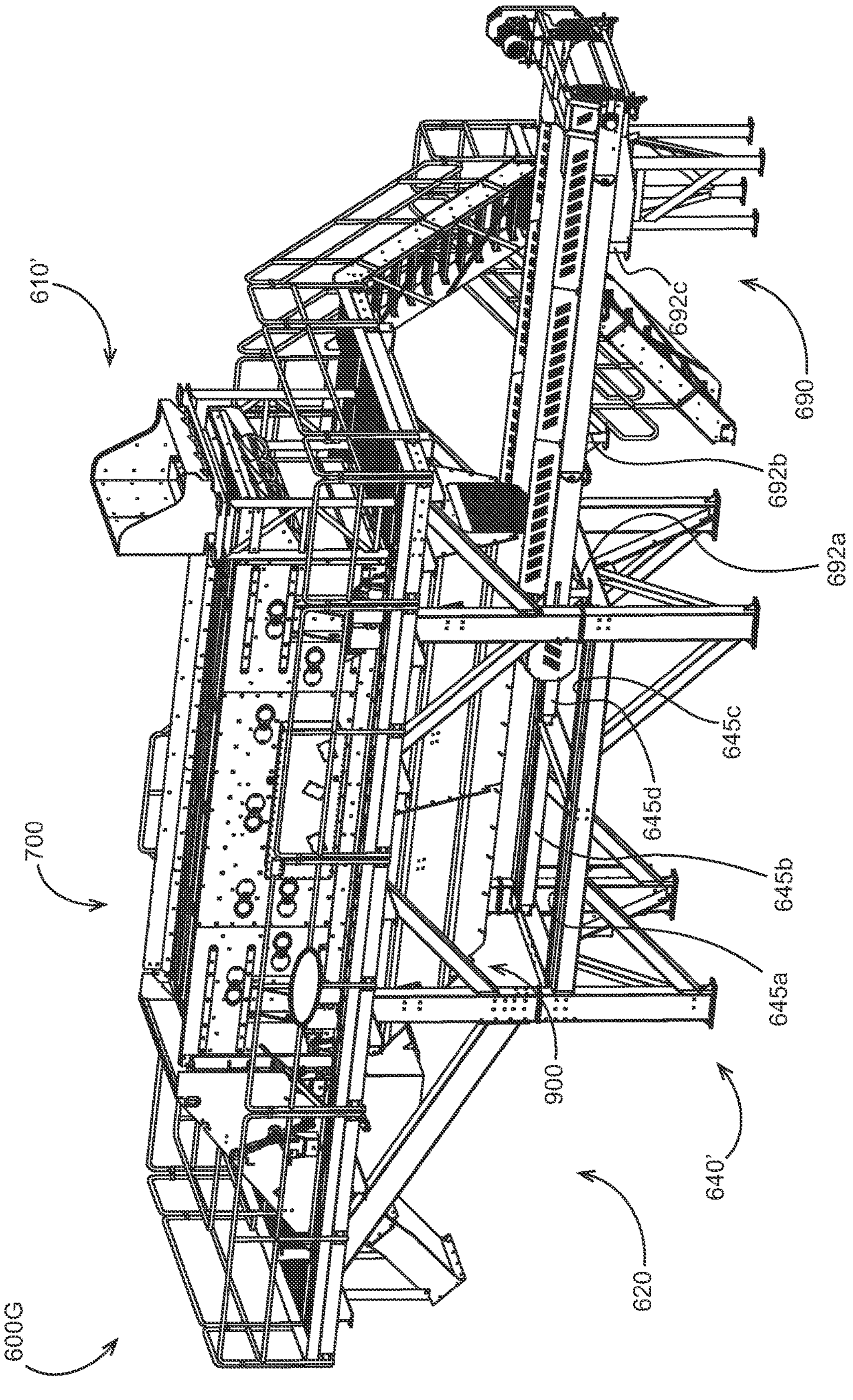
FIG. 12 is a perspective view of the aggregate processing plant of FIG. 5 in a partially reconfigured configuration.
Figure 14:
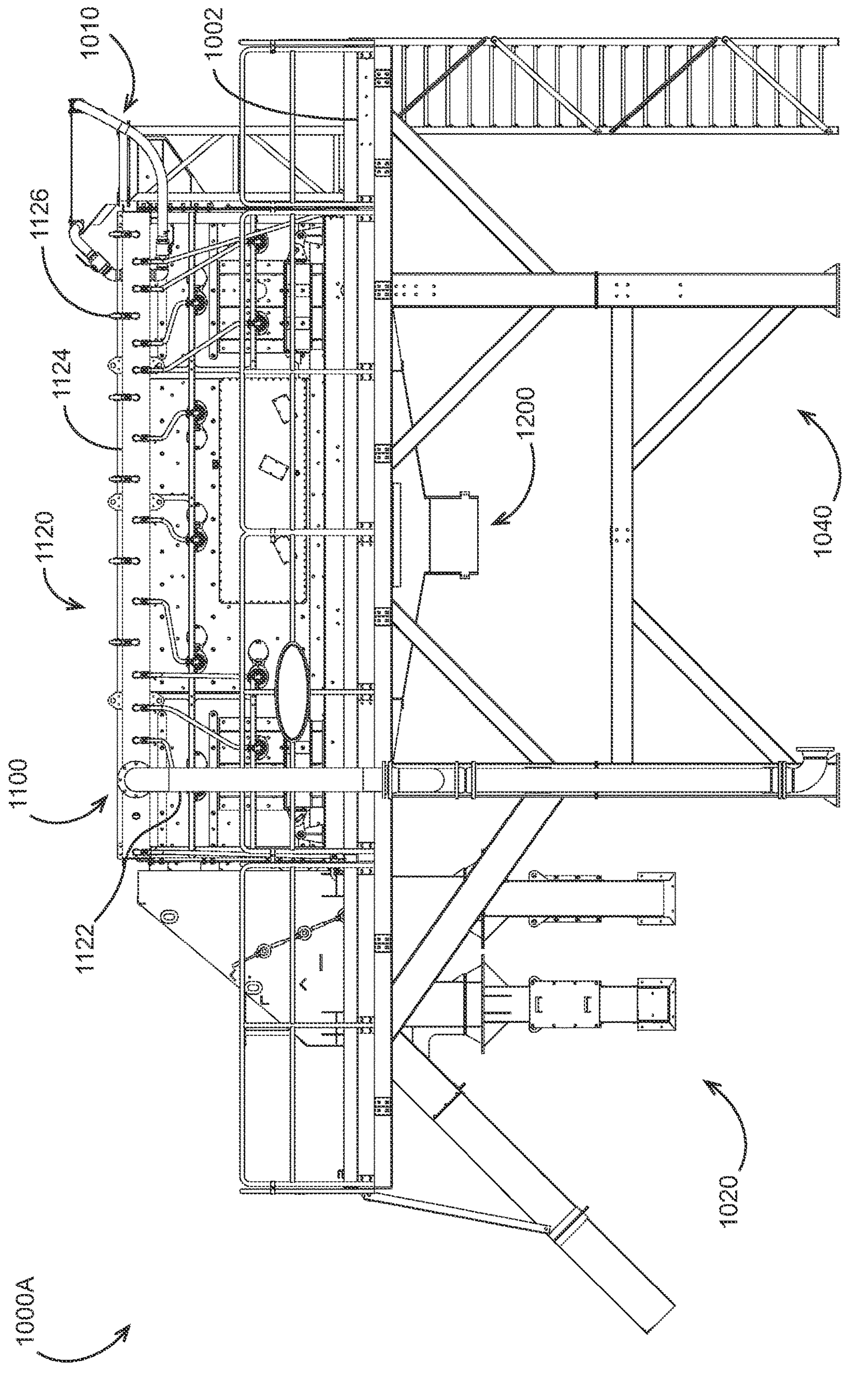
FIG. 14 is a side elevation view of another embodiment of an aggregate processing plant in a wet processing configuration.

Referring to FIG. 12, the plant 600 is shown in a partially reconfigured configuration 600G in which an unloading conveyor 690 is partially installed. Frame 640' optionally includes a plurality of tracks 645 disposed to support (e.g., slidingly support) one or more support legs 692 of the unloading conveyor 690. In an installation mode, the legs 692 are optionally slid across the tracks 645 (e.g., generally from right to left) in order to install the unloading conveyor 690 beneath the dry hopper 900 as shown in FIG. 14.

Figure 13:
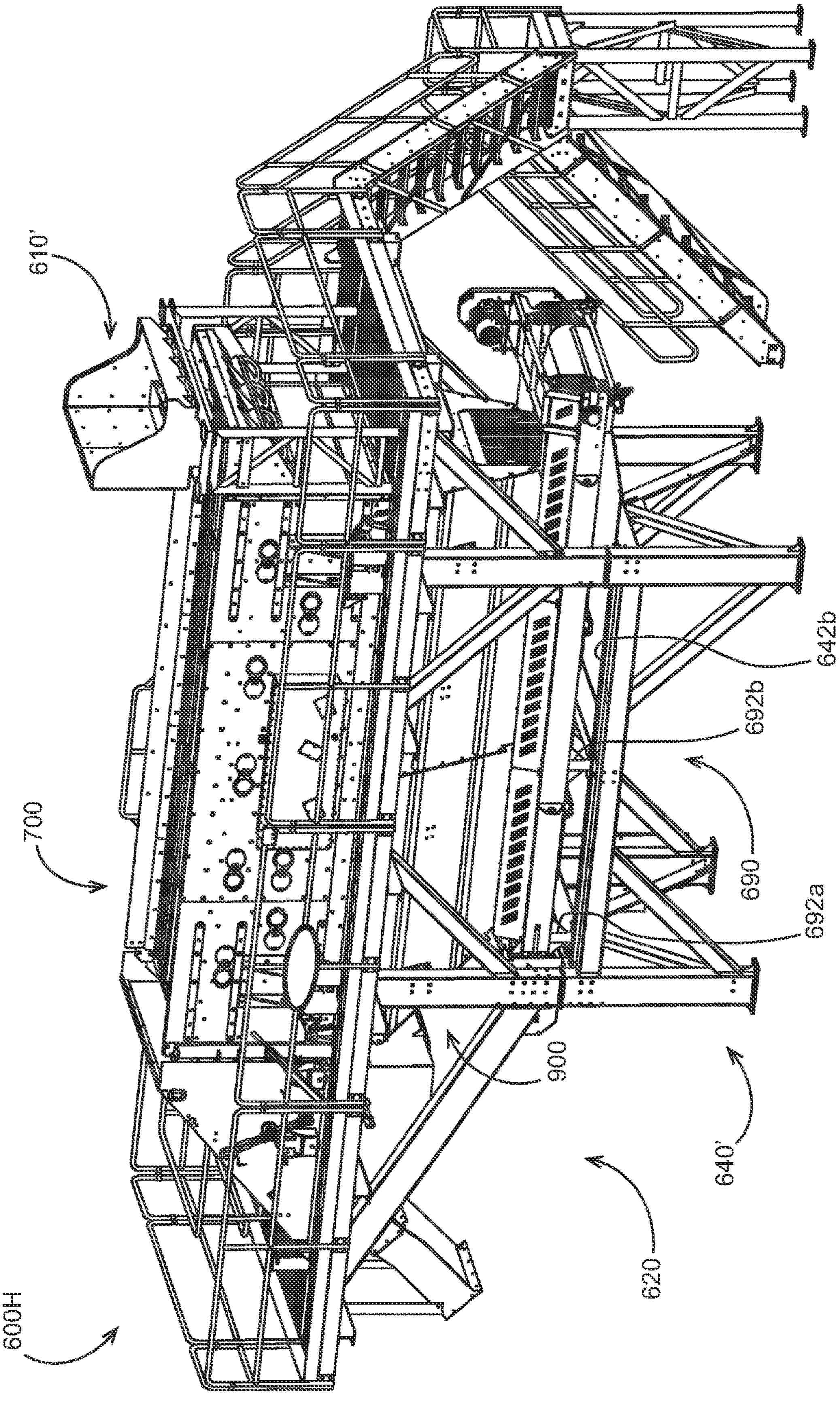
FIG. 13 is a perspective view of the aggregate processing plant of FIG. 5 in a dry processing configuration.

Referring to FIG. 13, the plant 600 is shown in a dry processing configuration 600H.

It should be appreciated that in some implementations the methods described with respect to FIGS. 5-13 may be at least partially re-ordered (e.g., at least partially reversed) in order to reconfigure the plant from the dry configuration to the wet configuration.

Referring to FIGS. 14-20, methods and apparatus are illustrated for reconfiguring an aggregate processing plant 1000 between a wet configuration and a dry configuration. The plant 1000 optionally has one or more features or functionality in common with the plants 100 and 600.

Referring to FIG. 14, the plant 1000 is shown in a wet configuration 1000A. The plant 1000 is optionally supported on a frame 1040. Frame 1040 optionally at least partially supports a platform 1002. The plant 1000 optionally includes a vibratory screen 1100 optionally including a water system 1120 with one or more water injection elements 1126 such as spray bars. In some embodiments, a conduit 1122 is in fluid communication with a manifold 1124 disposed at an upper end of screen 1100. The manifold 1124 is optionally in fluid communication with one or more injection elements 1126 for supplying water to each of the injection elements. A wet hopper 1010 (e.g., having one or more water injection elements such as spray bars in fluid communication with manifold 1124) is optionally provided at an inlet of the screen 1100. The plant 1000 optionally includes a chute assembly 1030 for directing oversize material passing over one or more decks of the screen 1100 (e.g., three decks, four decks, etc.). A wet flume 1200 is optionally removably supported on frame 1040 and disposed to receive undersize material passing through each of the decks of the screen 1100.

Figure 15:
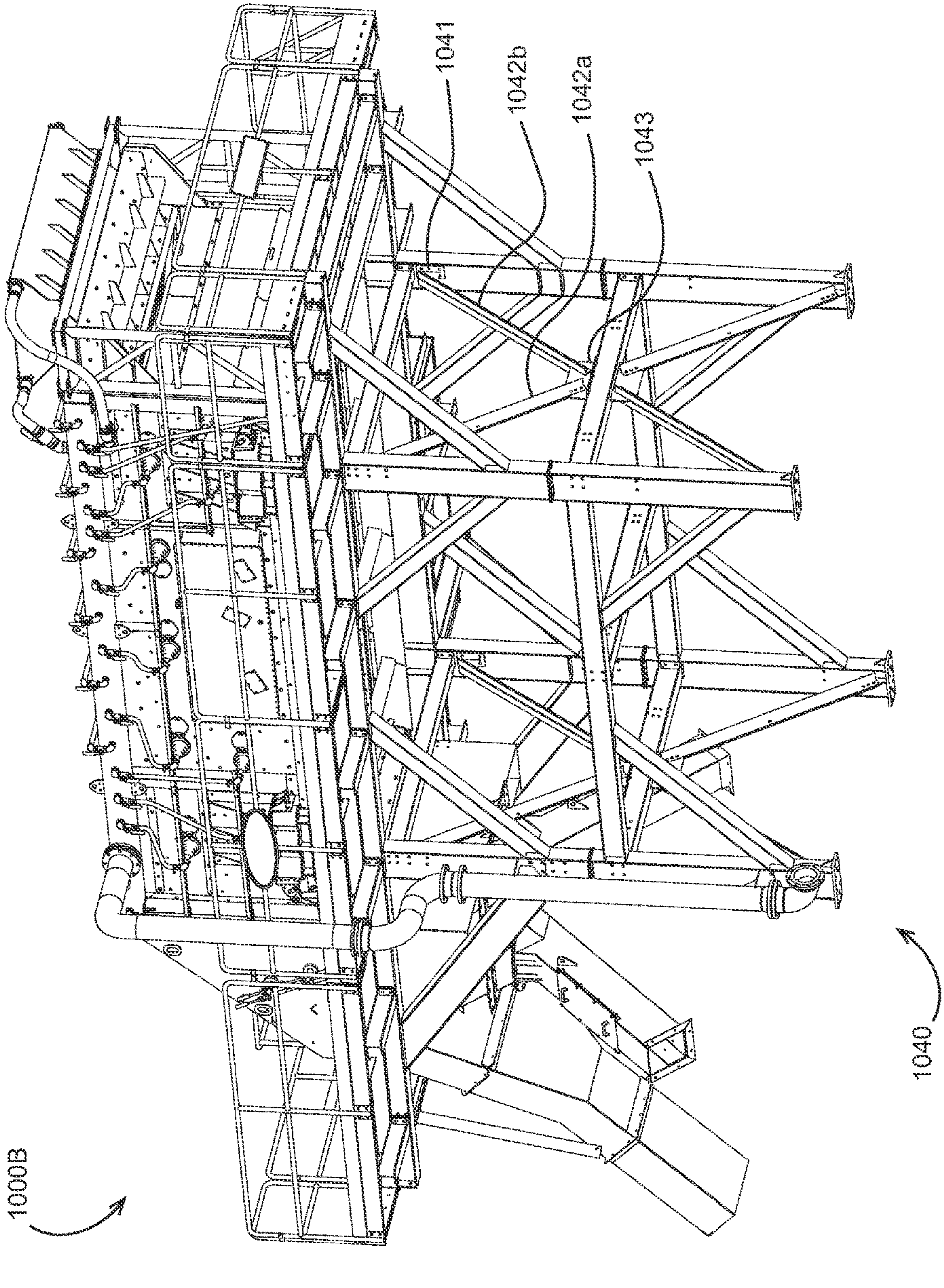
FIG. 15 is a perspective view of the aggregate processing plant of FIG. 14 in a partially reconfigured configuration.

Referring to FIG. 15, the plant 1000 is shown in a partially reconfigured configuration 1000B. In configuration 1000B, the wet flume 1200 is removed (e.g., by removing a plurality of fasteners removably fastening the wet flume to the frame 1040 using a plurality of bolt holes or other mounting features in the frame). In some embodiments, the wet flume is removed in sections (e.g., one or more sidewalls at a time and/or one or more front or rear walls at a time). Reconfiguration of the plant 1000 is optionally continued by removing one or more support members 1042 of frame 1040, e.g., by unfastening one or more mounting plates 1041, 1043 of the support members from the frame 1040. The mounting plates 1041, 1043 are optionally removably fastened to the frame using a plurality of fasteners such as bolts to removably fasten the mounting plates to a plurality of mounting features of frame 1040 such as bolt holes.

Figure 16:
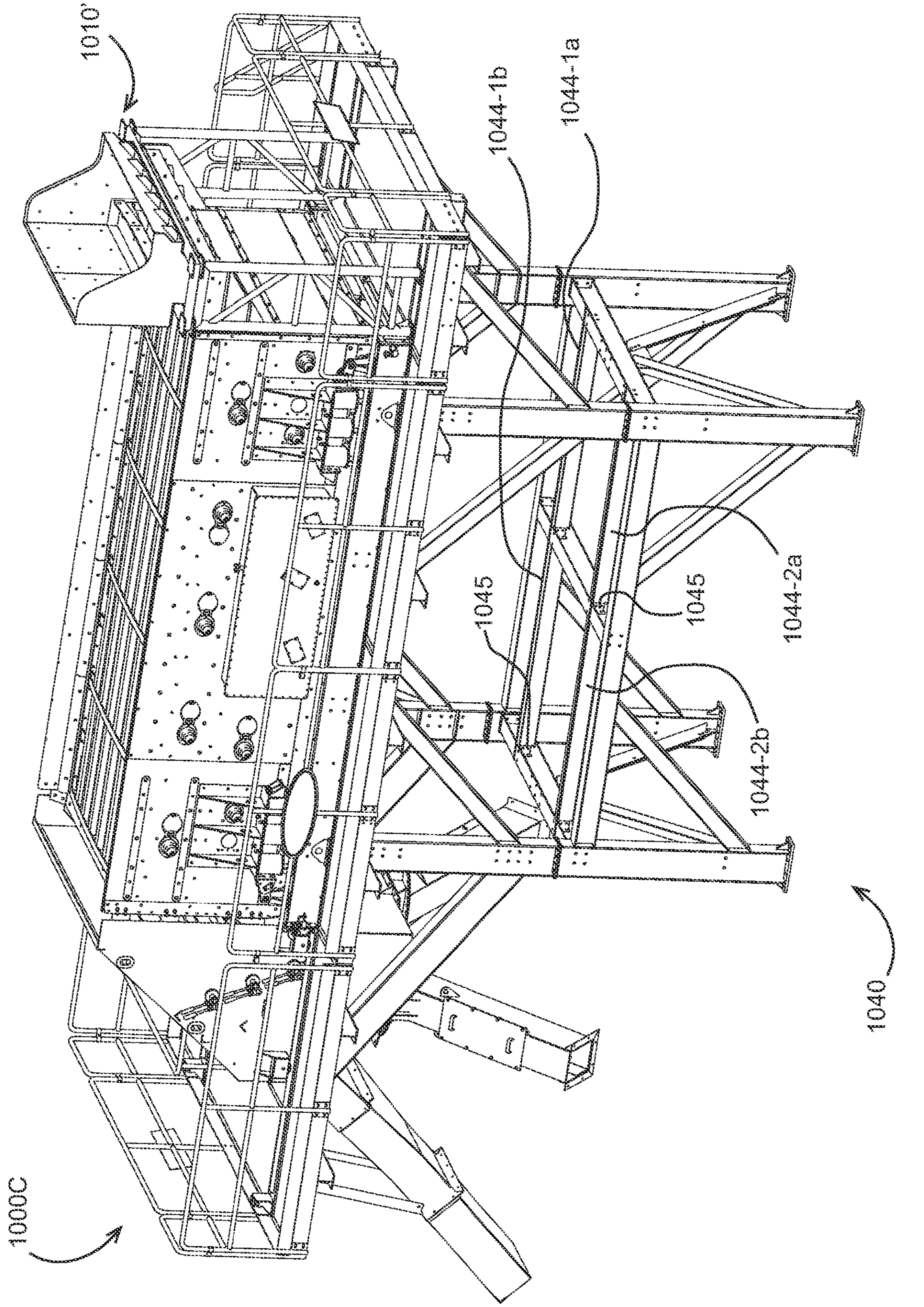
FIG. 16 is a perspective view of the aggregate processing plant of FIG. 14 in a partially reconfigured configuration.

Referring to FIG. 16, the plant 1000 is shown in a partially reconfigured configuration 1000C. In configuration 1000C, the wet hopper 1010 is optionally replaced with a dry hopper 1010 (e.g., not having a water injection element). In configuration 1000C, the water system 1120 is optionally removed from screen 1100. In configuration 1000C, (optionally longitudinally extending) slide tracks 1044 are optionally installed on frame 1020, e.g., using one or more mounting plates 1045. The mounting plates 1045 are optionally removably fastened to the frame using a plurality of fasteners such as bolts to removably fasten the mounting plates to a plurality of mounting features of frame 1040 such as bolt holes.

Figure 17:
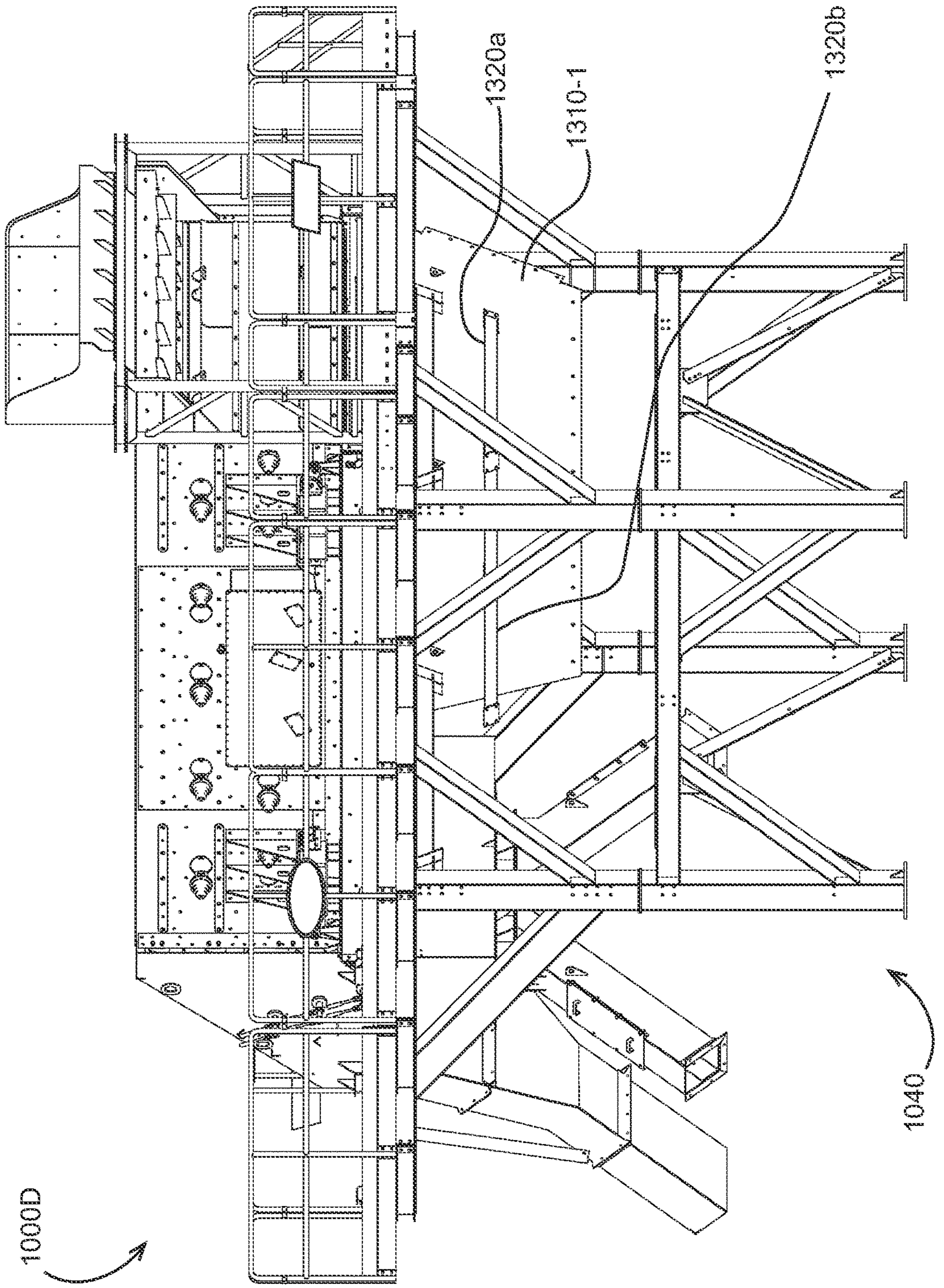
FIG. 17 is a side elevation view of the aggregate processing plant of FIG. 14 in a partially reconfigured configuration.
Figure 18:
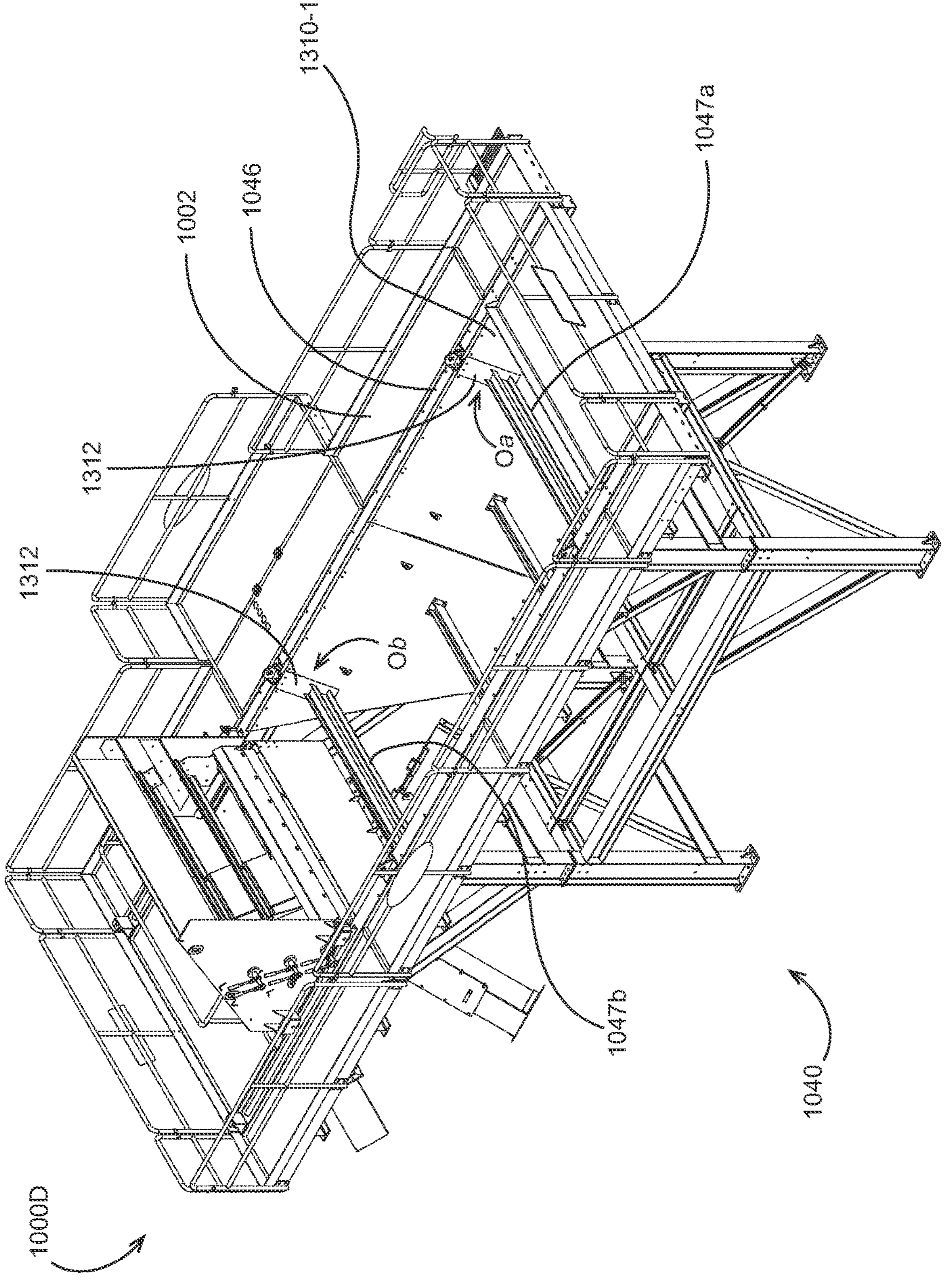
FIG. 18 is a perspective view of the aggregate processing plant of FIG. 14 in a partially reconfigured configuration with a screen assembly of the plant not shown.

Referring to FIGS. 17 and 18, the plant 1000 is shown in a partially reconfigured configuration 1000D. In configuration 1000D, installation of a dry hopper 1300 optionally begins by fastening a first sidewall 1310-1 to the frame 1040. In some embodiments, each sidewall 1310 comprises one or more openings O (e.g., slots formed in an upper end of the sidewall) for allowing the sidewall to be installed without interfering with an associated crossmember 1047 of frame 1040, which crossmember is at least partially received in the opening O upon installation of the sidewall. In some embodiments a pad 1312 (e.g., plastic, rubber or metal pad) is installed to the sidewall 1310 after installation of sidewall 1310 in order to cover the area of opening O between the crossmember 1047 and the sidewall 1310. In some embodiments an upper lip of the sidewall 1310 is optionally removably fastened to an upper beam 1046 (e.g., to the underside thereof) of frame 1040 using a plurality of fasteners such as bolts to removably fasten the mounting plates to a plurality of mounting features of frame 1040 such as bolt holes. In some embodiments one or more hopper crossmembers 1320 are attached to the sidewall 1310-1.

Figure 19:
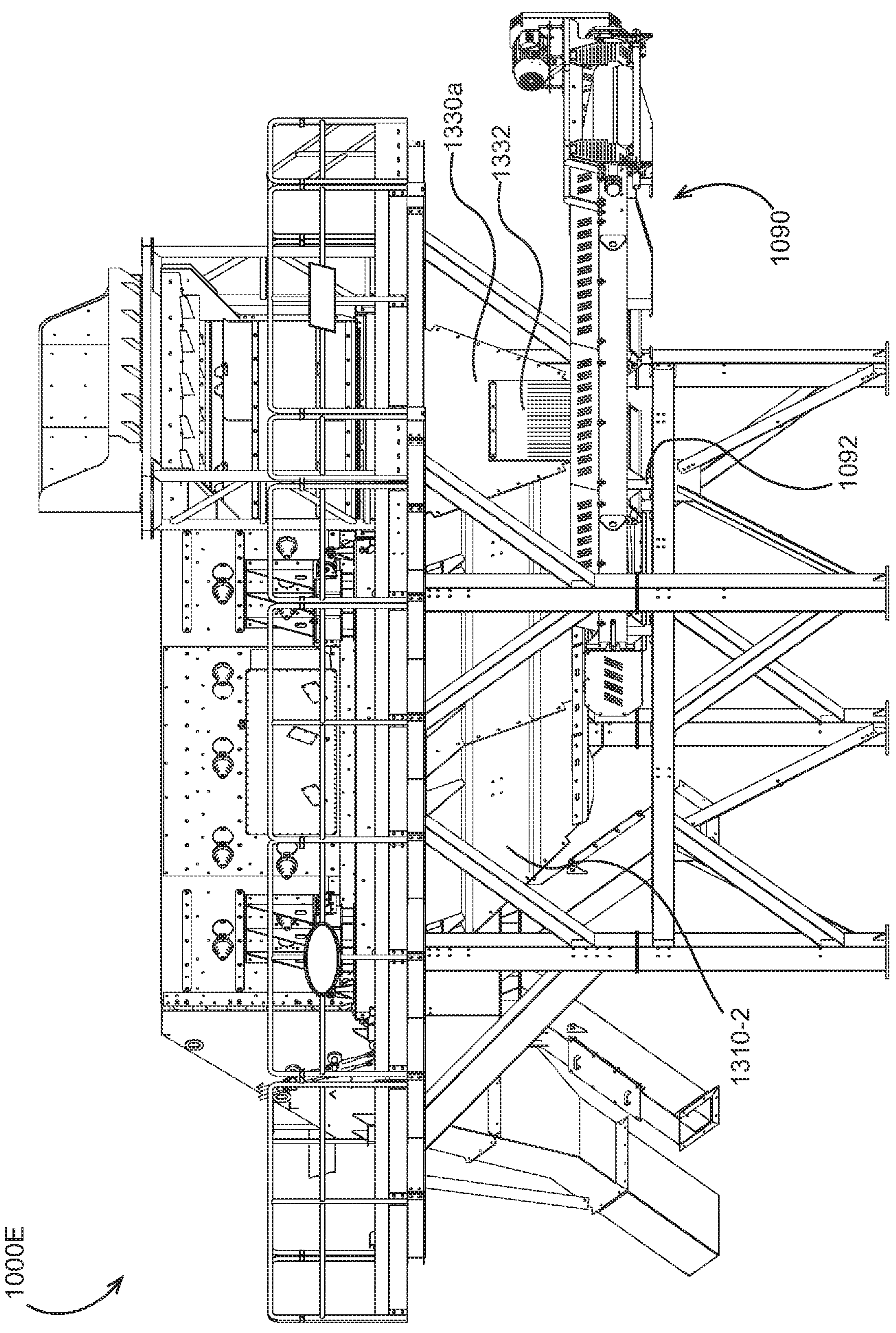
FIG. 19 is a side elevation view of the aggregate processing plant of FIG. 14 in a partially reconfigured configuration.

Referring to FIG. 19, the plant 1000 is shown in a partially reconfigured configuration 1000E. In configuration 1000E, the dry hopper 1300 is optionally completed by installing a second sidewall 1310-2 (e.g., by removably fastening sidewall 1310-2 to frame 1040 and/or the hopper crossmembers 1320 and by installing front and rear walls 1330 which optionally include flaps 1332 (e.g., rubber flaps optionally having one or more flexible downwardly extending fingers).

In configuration 1000E, a conveyor 1090 is optionally installed (e.g., after completion of dry hopper 1300) by sliding footings 1092 of the conveyor 1090 along slide tracks 1044 from a position forward (or rearward) of the dry hopper 1300 to a position at least partially beneath the dry hopper 1300.

Figure 20:
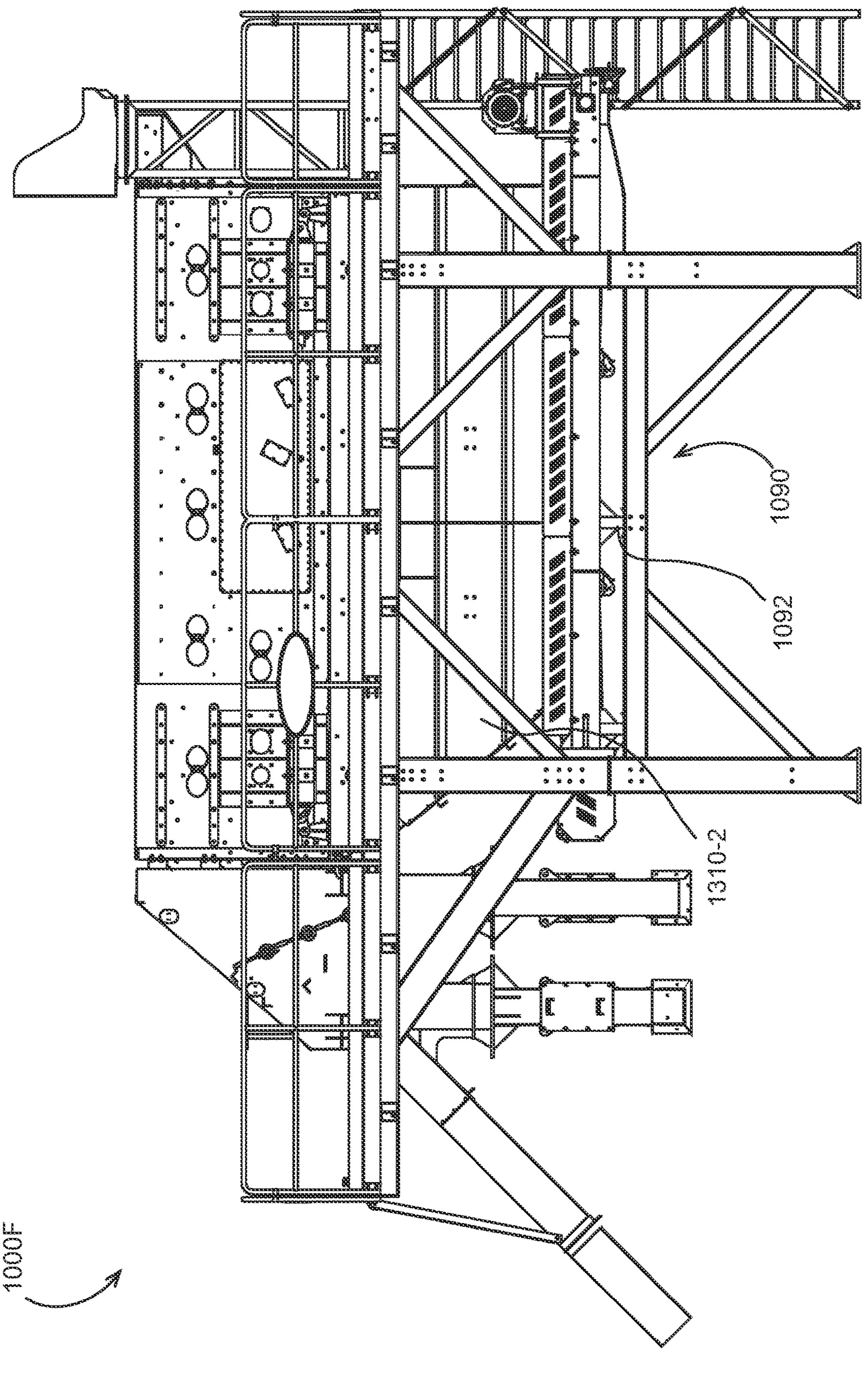
FIG. 20 is a side elevation view of the aggregate processing plant of FIG. 14 in a dry processing configuration.

The conveyor 1090 is shown fully installed in the completed dry configuration 1000F of FIG. 20.

It should be appreciated that in some implementations the methods described with respect to FIGS. 14-20 may be at least partially re-ordered (e.g., at least partially reversed) in order to reconfigure the plant from the dry configuration to the wet configuration.

Figure 21:
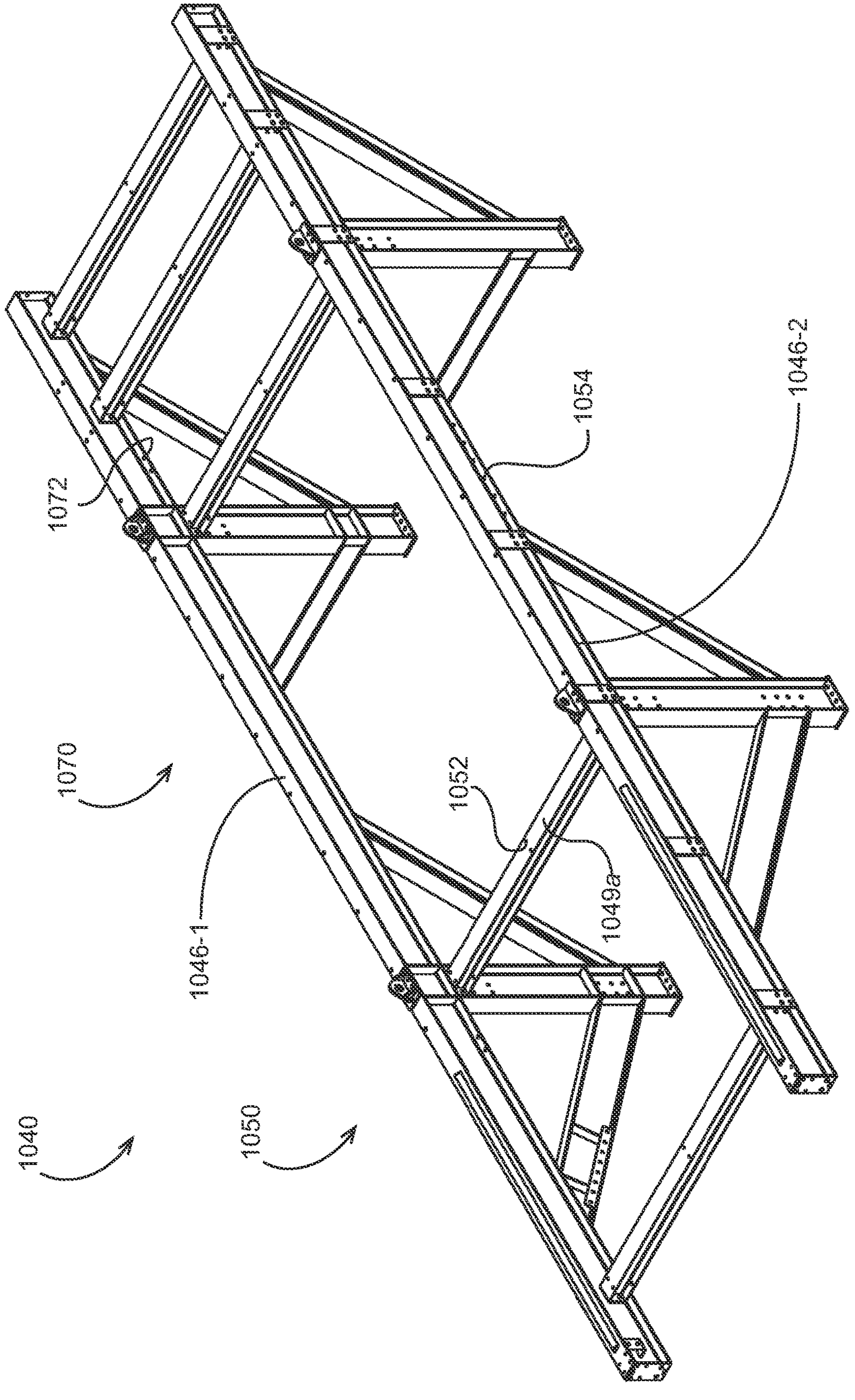
FIG. 21 is a perspective view of a frame of the aggregate processing plant of FIG. 14.

Referring to FIG. 21, an upper portion of frame 1040 is shown in more detail. A first bolt hole array 1050 (e.g., bolt holes 1052 in crossmembers 1049 and/or bolt holes 1054 in longitudinal beams 1046) is optionally used for selectively attaching and removing both the wet flume and dry hopper. A second bolt hole array 1070 (e.g., additional bolt holes 1072 in longitudinal beams 1046) is additionally used for selectively attaching and removing the dry hopper.

Figure 22:
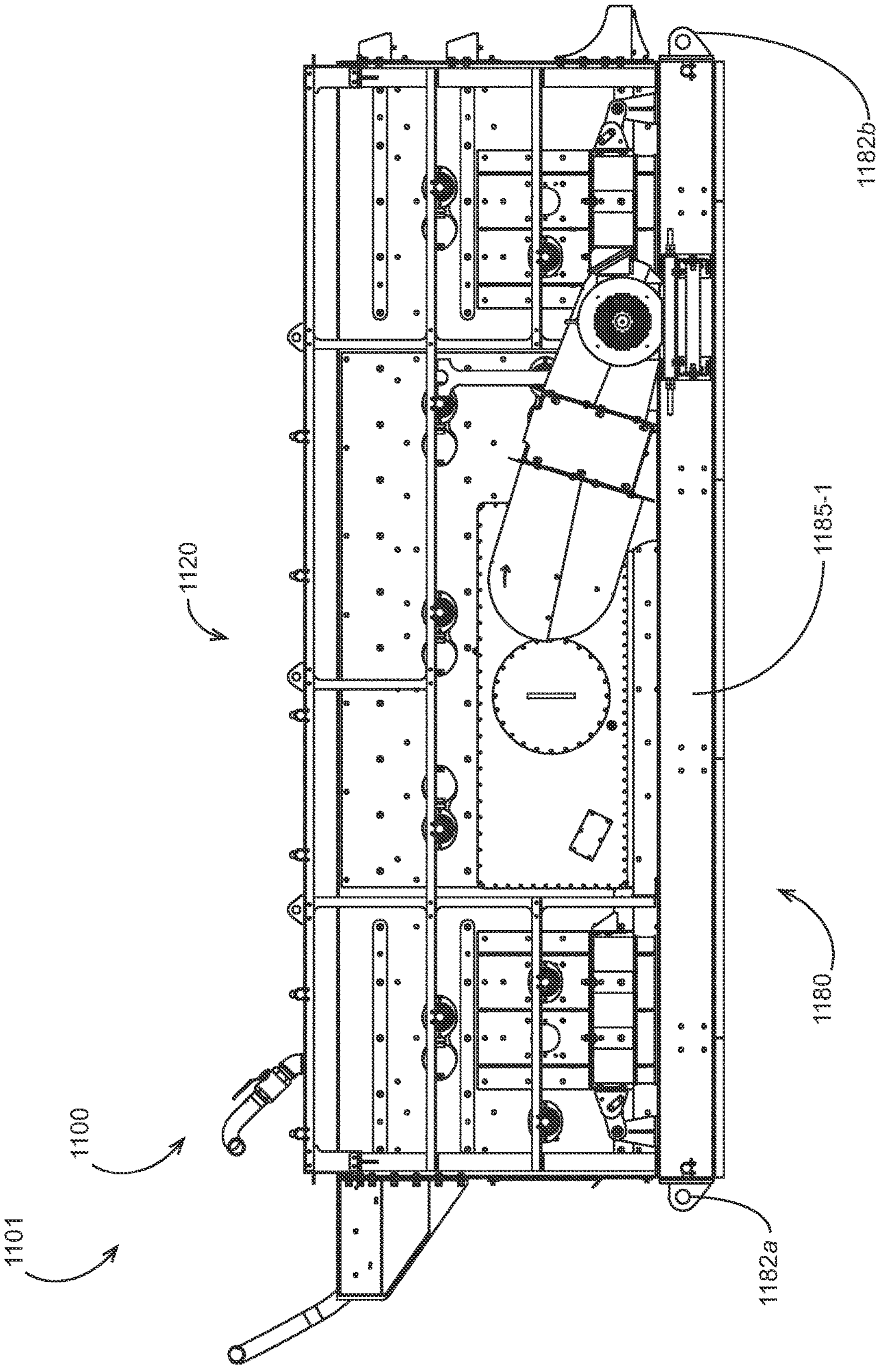
FIG. 22 is a perspective view of a screen assembly of the aggregate processing plant of FIG. 14.

Referring to FIG. 22, a screen assembly 1101 is shown comprising screen 1100 supported on a subframe 1180 comprising a pair of beams 1185. Each beam 1185 is optionally disposed at least partially under each sidewall. Each beam 1185 optionally includes forward and rearward lifting eyes 1182*a*, 1182*b*. In an installation step, the screen assembly 1100 is optionally lifted by lifting eyes 1182 and rested on the frame 1040, optionally such that the bottom surfaces of beams 1185 are flush with the platform 1002 and/or with upper surfaces of beams 1046. In some embodiments, the water system 1120 is installed on the screen assembly 1101 before the screen is installed on the frame 1040 (and/or during transport of the screen assembly such as on a shipping container or road transport trailer).

Figure 23:
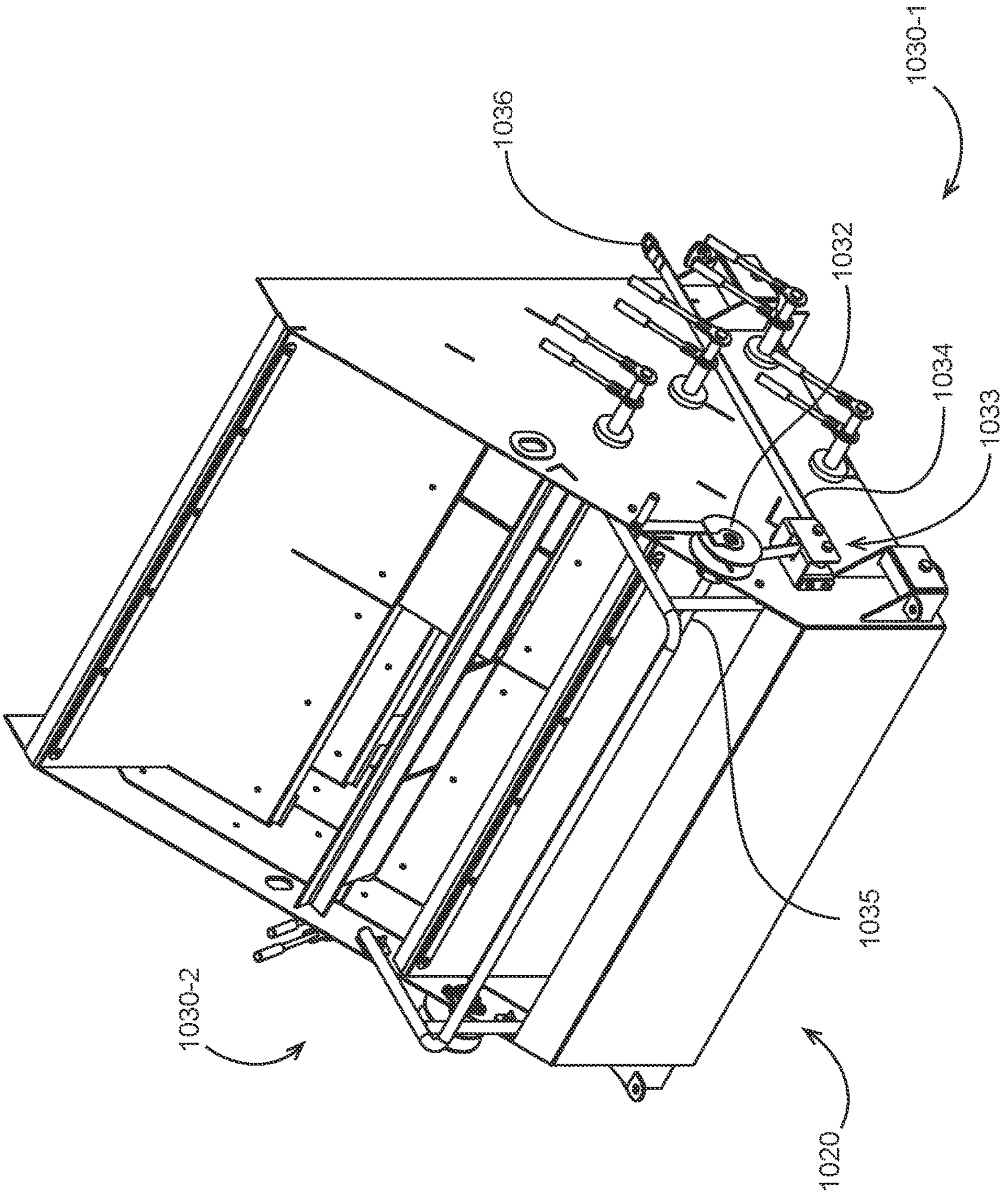
FIG. 23 is a perspective view of a chute assembly of the aggregate processing plant of FIG. 14.

Referring to FIG. 23, in some embodiments the chute assembly 1030 comprises one or more winch assemblies 1030 (e.g., first and second winch assemblies 1030-1, 1030-2 disposed on opposing sides of the chute assembly). In some embodiments, each winch assembly comprises a rope or strap 1034 which can be selectively attached to an attachment point on a structure forward or rearward of the chute assembly (e.g., rails or other features supported on platform 1002) such as by a hook 1036. The strap 1034 is optionally wrapped around a crank 1032 at a first end such that the crank 1032 can be turned by an operator in order to shorten the effective length of strap 1034 and advance or retract the chute assembly. The strap optionally engages one or more rollers 1033 to redirect the direction of tension force from the crank 1032 to the selected attachment point. In some embodiments, the cranks 1032 of left and right winch assemblies 1030 are joined by a rod 1035 such that turning the crank 1032 of one winch assembly causes synchronized rotation of the crank of the other winch assembly.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. An aggregate processing plant having first and second configurations, the plant comprising:
- a vibratory screen having at least first and second decks;
- a frame operably supporting said vibratory screen, said frame comprising first and second longitudinal members and first and second crossmembers, said crossmembers being perpendicular to said longitudinal members said frame having a first set of downwardly-oriented mounting openings comprising bolt holes and a second set of downwardly-oriented mounting openings comprising bolt holes, said first set of mounting openings being different from said second set of mounting openings, said first set of mounting openings being fastenable to a wet flume beneath said vibratory screen in the first configuration, said second set of mounting openings being fastenable to a dry hopper beneath said vibratory screen in the second configuration, wherein both first and second sets of mounting openings include openings in both of said longitudinal members, wherein at least one of said first and second set of mounting openings includes openings in both of said longitudinal members and at least one of said crossmembers.

2. The aggregate processing plant of claim 1, wherein said dry hopper comprises a first sidewall removably mounted to a first subset of said second set of mounting openings.

3. The aggregate processing plant of claim 2, wherein said dry hopper comprises a plurality of crossmembers, said crossmembers each having a first end and a second end, said first ends being removably attached to said first sidewall.

4. The aggregate processing plant of claim 3, wherein said dry hopper comprises a second sidewall, said second sidewall being removably attached to said second ends of said crossmembers.

5. The aggregate processing plant of claim 4, wherein said second sidewall is removably attached to a second subset of said second set of mounting openings.

6. The aggregate processing plant of claim 5, wherein said frame comprises a plurality of angled supports disposed to support the dry hopper, said angled supports not contacting said wet flume in the first configuration.

7. The aggregate processing plant of claim 1, wherein said frame comprises a plurality of angled supports disposed to support the dry hopper, said angled supports not contacting the wet flume in the first configuration.

8. The aggregate processing plant of claim 1, wherein said frame comprises first and second supports configured to removably support a conveyor beneath the vibratory screen.

9. The aggregate processing plant of claim 8, wherein said conveyor is disposed immediately below said dry hopper in said second configuration.

10. The aggregate processing plant of claim 9, wherein a height of said dry hopper measured from an upper end of said dry hopper to a lower end of said dry hopper is greater than a height of said wet flume measured from an upper end of said wet flume to a lower end of said wet flume.

11. The aggregate processing plant of claim 8, wherein said frame comprises first and second slide tracks configured to slidingly support said conveyor beneath the vibratory screen.

12. The aggregate processing plant of claim 1, wherein said vibratory screen is reconfigurable by installing one of a plurality of chute assemblies.

13. The aggregate processing plant of claim 1, wherein said vibratory screen is reconfigurable by installing one of a plurality of inlet hoppers.

14. The aggregate processing plant of claim 1, wherein said vibratory screen is reconfigurable by installing or removing a water system having a plurality of water injection elements.

15. An aggregate processing plant having first and second configurations, the plant comprising:

a vibratory screen;

a frame operably supporting said vibratory screen, said frame comprising first and second longitudinal members and first and second crossmembers, said crossmembers being perpendicular to said longitudinal members said frame having a first and second set of downwardly-oriented mounting openings, said mounting openings comprising bolt holes, said first and second set of mounting openings being configured to alternately support with removable fasteners a wet flume beneath said vibratory screen in the first configuration and a dry hopper beneath said vibratory screen in the second configuration, wherein said frame comprises first and second supports configured to removably support a conveyor beneath the vibratory screen, wherein both first and second sets of mounting openings include openings in both of said longitudinal members, wherein at least one of said first and second set of mounting openings includes openings in both of said longitudinal members and at least one of said crossmembers.

16. The aggregate processing plant of claim 15, wherein said conveyor is disposed immediately below said dry hopper in said second configuration.

17. The aggregate processing plant of claim 16, wherein a height of said dry hopper measured from an upper end of said dry hopper to a lower end of said dry hopper is greater than a height of said wet flume measured from an upper end of said wet flume to a lower end of said wet flume.

18. The aggregate processing plant of claim 17, wherein said frame comprises a plurality of angled supports disposed to support said dry hopper, said angled supports not contacting said wet flume in the first configuration.

19. The plant of claim 1, wherein said first set of mounting openings comprises a first array of bolt holes, and wherein said second set of mounting openings comprises a second array of bolt holes.

20. The plant of claim 1, wherein said first set of mounting openings comprises a different number of mounting openings than said second set of mounting openings.

21. The plant of claim 20, wherein said first set of mounting openings comprises at least one mounting opening in at least one longitudinal beam of said frame and at least one mounting opening in at least one crossmember of said frame.

22. The plant of claim 1, wherein said first set of mounting openings comprises at least one mounting opening in at least one longitudinal beam of said frame and at least one mounting opening in at least one crossmember of said frame.

23. The plant of claim 1, wherein said second set of mounting openings comprises at least one mounting opening in at least one longitudinal beam of said frame and at least one mounting opening in at least one crossmember of said frame.

24. The plant of claim 22, wherein said second set of mounting openings comprises at least one mounting opening in at least one longitudinal beam of said frame and at least one mounting opening in at least one crossmember of said frame.

* * * * *